United States Patent Office 3,148,143
Patented Sept. 8, 1964

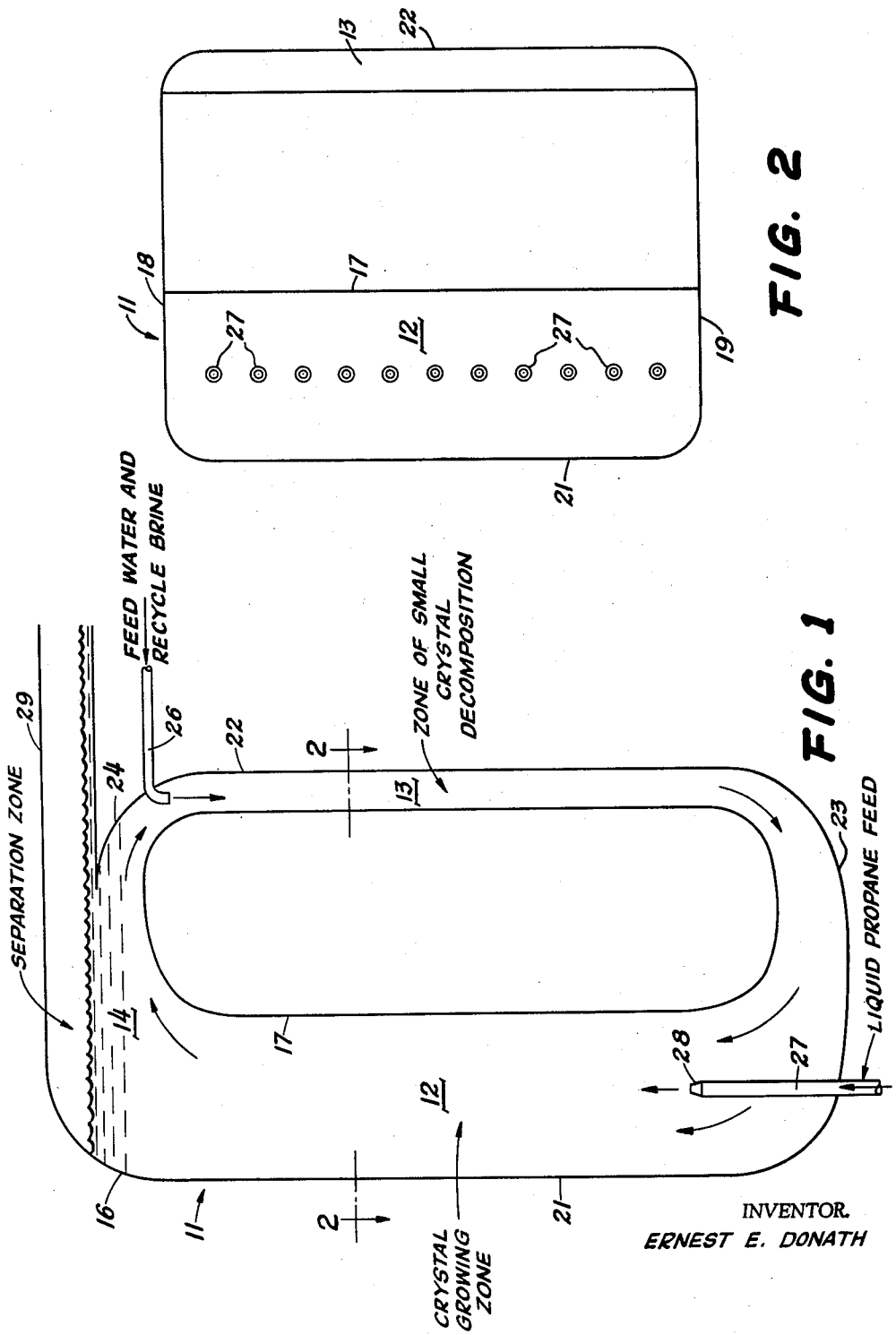

3,148,143
HYDRATE CRYSTALLIZER
Ernest E. Donath, Pittsburgh, Pa., assignor to Koppers Company, Inc., a corporation of Delaware
Filed Jan. 16, 1962, Ser. No. 167,472
6 Claims. (Cl. 210—60)

This invention relates to a method and apparatus for separating water from aqueous systems by the formation of hydrates with the water and, more particularly, to an improved apparatus for forming large uniform hydrate crystals.

This invention arose during performance pursuant to a contract with the United States Government, Office of Saline Water.

The broad concept of producing potable water from saline solutions, such as sea water, by contacting the saline solution in a hydrate-forming zone with a hydrate-forming substance under hydrate-forming conditions of temperature and pressure to form a hydrate separable from the saline solution is disclosed in United States Patent 2,904,511 by Wilm E. Donath.

In an effort to produce an inexpensive commercial process for the production of potable water from said water using the teachings of the Donath patent, engineering studies have been conducted. These studies have shown that the filter-washer employed to separate the hydrate crystals from and cleanse the hydrate crystals of contaminating brine is now the most expensive single item of equipment employed in this process and offers, therefore, the greatest challenge to the evolution of inventive concepts to materially reduce the expense of these operations of filtering and washing.

The importance of developing a cheap, efficient method for converting sea water and brackish water to potable water is becoming more sharply defined and its urgency more universally recognized as a result of about 90 studies made by various agencies of the United States Government. At present, our fresh water supply is adequate with a ratio of 5 gallons of available fresh water supply for each 3 gallons of fresh water demand. It is estimated as a result of these studies, however, that in about fifteen years this ratio will have changed to the point where there will be only 3 gallons of available fresh water supply for each 5 gallons of fresh water demand. In order to offset this ratio of supply to demand attention is being directed to an earnest search for commercial methods of providing our future needs for potable water from the sea.

It has been recognized that if improvements can be effected in the formation of the hydrate crystal, particularly in the size and uniformity thereof, such improvements will markedly reduce the cost of the filtering and washing operations. Laboratory tests have shown that by producing hydrate crystals of larger uniform size they will be more easily separated from the brine and be cleansed to the desired degree with fewer washings resulting in smaller wash water consumption. The beneficial results, therefore, flowing from successful production of uniform larger hydrate crystals will be an increase in the speed with which the filtering and washing operations may be conducted and consequently a reduction in the size of the equipment necessary for these operations.

Although the method and apparatus disclosed herein will be described in connection with the use of liquid propane as the hydrate-forming substance, it is to be recognized that the same advantages available in connection with the formation of propane hydrate crystals by the use of this method and apparatus will inure particularly to the formation of hydrate crystals with those other hydrate-forming substances, gaseous or liquid, having slight solubility in water. As is well-known, hydrates may be formed with those paraffin hydrocarbons (in addition to propane) having from 1 to 4 carbon atoms, carbon dioxide, mixed halides of methane and ethane, propylene, ethylene, acetylene, methyl chloride, ethyl fluoride, chlorine, argon, etc. in gaseous or liquified form.

Although primary emphasis in the development of this process has been placed on the conversion of saline water to potable water, it should be equally well recognized that the method and apparatus disclosed herein in connection with the formation of hydrate crystals is generally applicable in dehydration procedures and as such are applicable in the removal of water from various beverages such as fruit juices and beer.

It is, therefore, an object of the present invention to provide a unitary recycle reactor unit constructed having simple but efficient means for varying the temperature in various zones of the unitary system whereby excessive amounts of crystal nuclei in the recycle brine are destroyed and the growth of surviving crystal nuclei is enhanced to produce larger uniform hydrate crystals.

It is another object of the present invention to provide an efficient unitary reactor unit wherein a circulatory movement is induced in the aqueous system contained in the reactor by the combined effects of the velocity of entering feed water, and by the phenomenon of gas lift caused by the vaporization of the hydrate-forming substance.

It is a further object of the present invention to provide an improved method for the formation of hydrate crystals wherein larger crystals uniform in size are formed facilitating the filtering and cleaning thereof.

The above objects are realized in the present invention by the provision of a unitary reactor apparatus and a unique method wherein such conditions of temperature prevail in separate portions thereof as result in the establishment of three zones which are not sharply defined yet in which different temperature conditions prevail. These zones are; a crystal growing or hydrate-forming zone, decomposition zone and a separation zone.

The power demands for the successful operation of this apparatus are maintained at a low level by ingenious utilization of the velocity of the entering feed water coupled with the upward movement caused by the vaporization of the hydrate-forming substance below the crystal-growing zone in order to produce the requisite circulation in the reactor.

Other objects and many attendant advantages of this invention will be readily appreciated as the same becomes better understood by reference to the following detailed description when considered in connection with the accompanying drawings in which like reference numerals designate like parts throughout the figures thereof and wherein:

FIG. 1 is a vertical section through a preferred embodiment of the unitary recycle reactor unit and FIG. 2 is a section through the apparatus taken on line 2—2 of FIG. 1.

FIGS. 1 and 2 schematically represent the preferred embodiment of the unitary recycle reactor 11 substantially filled with saline water and the arrangement therein of crystal growing zone 12, crystal decomposition zone 13 and separation zone 14. Since the definition of these zones is in general a matter of gradation of temperatures, the zones are not sharply defined and zone 12 slowly merges with zone 14, zone 14 merges with zone 13 and zone 13 merges with zone 12.

The outer housing 16 of reactor 11 of steel or similar corrosion-resistant material is represented as being in the general shape of a rectangular solid. However, the particular shape employed may be widely varied, so long as the internal construction maintains the relative sizes of crystal growing zone 12 and decomposition zone 13 in the ratio of from 3 to 1 to 20 to 1 and preferably from 5 to 1 to 15 to 1. As will be explained in greater detail below continuous circulation of the saline water is from zone 12 to zone 13 to zone 14 and back to zone 12.

In order to aid in the definition of the separate zones and to determine their relative sizes, a large baffle 17 is mounted within housing 16 and may take the form of a large hollow shell extending the length of housing 16 and affixed to end walls 18 and 19 being spaced from side walls 21 and 22 and terminating short of bottom 23 and top 24.

The primary object of this construction is to provide crystal growing zone 12, which by itself is equivalent to the usual reactor employed for hydrate formation, with a side-loop through which a volume of more than 12 and preferably more than 25 times as much primary brine may be recycled from zone 12 as the volume of fresh saline solution feed and secondary brine which is added through pipe 26. The path of induced recirculation is shown by arrows in the various portions of reactor unit 11. For convenience, that brine circulated over baffle 17 into zone 13 is termed "primary" brine while that brine returned to reactor unit 11 from the filtering and washing operations through pipe 26 is referred to as "secondary" brine.

Circulation between the several zones within reactor 11 is induced in part by the velocity of the fresh saline solution and secondary brine introduced into zone 13 through the pipe 26. This feed is directed in a downward direction and because of its velocity transfers energy to induce the downward movement of the primary brine. In the case of propane as a hydrate former the temperature of the incoming feed is set such that after mixing with the primary brine circulated from zone 14, the prevailing temperature in zone 13 is from 0.1° to 3° C. above the prevailing temperature in zone 12. The preferable prevailing temperature in zone 13 in the case of propane is from 0.4° to 2° C. above the prevailing temperature in zone 12.

This slightly elevated temperature in zone 13 serves to partially decompose those larger, suspended propane hydrate crystals and to completely decompose the small propane hydrate crystals and crystal nuclei carried into zone 13 in the primary brine.

The degree of crystal destruction is a function of two variables, temperature and residence time. Residence time is determined by the recirculation velocity and by the depth in a vertical direction of zone 13. Having fixed either of these two variables for a given reactor unit, the other variable may be fixed with routine experimentation and/or reasonably simple calculations.

The descending mixture of recirculated primary brine, feed water and secondary brine leaves zone 13 and enters crystal growing zone 12 wherein crystal growth is achieved by the introduction into reactor 11 of hydrate-forming material, in this case liquid propane, through inlet pipes 27. Since the liquid propane feed is only slightly soluble in water, the propane must be introduced into successive unsaturated portions of brine in order to dissolve the maximum amount of propane in the brine. The induced circulatory motion of the contents of reactor 11 constantly exposes unsaturated portions of brine to the entering liquid propane feed. By introducing the propane through nozzles 28 or by the use of stirrers (not shown) or other known means, the liquid propane feed is finally divided and rapidly dispersed in the circulating brine.

As a result of this fine division and rapid dispersal of the liquid propane feed, three advantageous effects are produced. First, part of the liquid propane vaporizes and supplies the refrigeration effect required to reduce the prevailing temperature in zone 2 to within the range of −3° to +3° C. thereby establishing the desired hydrate-forming reaction temperature. At this prevailing temperature in zone 12, those seedling propane hydrate crystals which survive the decomposition step in zone 13 and are recirculated to zone 12 grow and produce large hydrate crystals of relatively uniform size. Secondly, the vaporization of part of the propane imposes an upward force on the brine in zone 12 as a result of gas lift and induces upward movement thereof thereby further fostering the desired recirculation of brine. Thirdly, the finely divided liquid propane saturates the circulating brine more quickly thereby promoting a more efficient hydrate-forming operation.

The solubility of propane in water under the reaction conditions (temperatures between −3° and +3° C.; pressure of about 50 p.s.i.a.) in reactor 11 is sufficient to convert 0.4 percent of the aqueous solution into hydrate. This means that the solution has to be resaturated with propane many times in order to achieve an economically satisfactory conversion of about 40 percent of the feed water. One manner in which the solution will be constantly resaturated is by rapid stirring of the reactor contents. As engineering calculations have shown, this approach requires expending a considerable amount of energy.

As has been previously stated, although the present description is directed toward the use of liquid propane, the same advantages inure to the use of gaseous propane and to other liquid and gaseous hydrate-formers.

In contrast thereto with the method and apparatus disclosed herein recirculation of brine and consequent increased propane saturation can be effected with a minimum of expended energy providing a substantial percentage of conversion in spite of the low solubility of propane.

As is indicated in FIG. 1, the crystal growth zone is immediately above the level at which the recirculating brine is saturated with propane. After the formation of the propane hydrate crystals in zone 12, the crystals formed, the gaseous propane and the more saturated brine rise from the crystal growing zone 12 and enter separation zone 14 as a result of the gas lift provided by the propane vaporization. Here, the gaseous propane is disengaged from the liquid contents of the reactor and passes off through conduit 29 for conversion to liquid propane. Since the larger hydrate crystals have more of a tendency to float than the smaller crystals, these larger crystals are skimmed off the surface and removed from reactor 11 through conduit 29 along with the propane gas.

If desired, the separation zone could be constructed to provide for removal of the propane gas separately from the larger hydrate crystals. Also, a thickener or centrifugal unit, neither of which is shown, may be employed to provide more definitive separation of the slurry of larger crystals from the undesirable accumulation of small hydrate crystals which accompany the liquid contents of the reactor (primary recycle brine). This primary brine then moves into zone 13 for the decomposition of the very small crystals and partial decomposition of those larger crystals remaining therein.

In view of the above disclosure, it may be seen that by the use of simple construction and by the provision of means for maintaining a relatively small temperature differential in the apparatus, a unitary recycle reactor has been devised which greatly facilitates the resaturation of the contents of the reactor with a hydrate-forming substance of slight solubility in water. This resaturation is accomplished with minimum expenditure of energy yet with a high degree of hydrate formation.

Although temperatures and pressures disclosed herein have been specific for the use of propane as the hydrate-forming material, it should be readily appreciated that the temperatures and pressures in the crystal growing zone 12 and in the zone of partial crystal decomposition 13 will depend upon the particular hydrate-forming material employed and the concentration of the aqueous system in the reactor. In this case the aqueous system employed has been sea water. Optimum temperature and pressure

What is claimed:

1. The method for separating water from an aqueous solution comprising supplying an excess of liquid propane to a vertical hydrate-forming zone as finely divided droplets for contact with an aqueous solution in a hydrate-forming zone under conditions favoring hydrate formation to form hydrate crystals, part of said droplets vaporizing and reducing the temperature in the aqueous system in said hydrate-forming zone to from $-3°$ to $+3°$ C., the vaporization of part of said droplets impressing an upward force on the solution and hydrate to circulate the aqueous system upward through said hydrate-forming zone, removing a substantial portion of hydrate crystals in a separation zone from the remaining aqueous solution, continuously circulating said aqueous solution to a vertical hydrate decomposition zone that is $1/3$ to $1/20$ as large as the hydrate-forming zone and circulating said solution with substantial velocity down through said decomposition zone while raising the temperature of the aqueous solution circulating through said decomposition zone under conditions favoring hydrate decomposition at a temperature from $0.1°$ to $3.0°$ C. higher than the temperature in said hydrate-forming zone by continuously admitting fresh aqueous solution thereby decomposing hydrate crystals in said decomposition zone.

2. The method for separating water from an aqueous solution substantially as recited in claim 1 wherein the amount of fresh aqueous solution continuously admitted to the decomposition zone is more than 25 times the volume circulating through the decomposition zone from said separation zone.

3. The method for separating water from an aqueous solution comprising supplying a hydrate-forming material to a hydrate-forming zone under conditions favoring hydrate formations to form hydrate crystals, said hydrate-forming material being a gas at room temperature and atmospheric pressure, at least part of the hydrate-forming material existing in said hydrate-forming zone in the gaseous state and impressing an upward force on the aqueous solution to circulate the aqueous solution upward through said hydrate-forming zone, removing in a separation zone a substantial portion of said hydrate crystals from the remainder of the aqueous solution, continuously admitting fresh aqueous solution to a decomposition zone with substantial downward velocity for inducing the aqueous solution to circulate downwardly through said decomposition zone, said hydrate forming zone being 3 to 20 times larger than said hydrate decomposition zone and raising the temperature of the aqueous solution circulating through said decomposition zone to a temperature from $0.1°$ to $3.0°$ C. higher than the temperature in said hydrate-forming zone to provide conditions favoring hydrate decomposition by continuously admitting fresh aqueous solution thereby partially decomposing suspended larger crystals and completely decomposing small crystals present in said decomposition zone and circulating said solution from said decomposition zone back to said hydrate-formation zone.

4. The method for separating water from an aqueous solution substantially as recited in claim 3 wherein the residence time of the aqueous solution in the hydrate-forming zone is from 5 to 15 times greater than the residence time of the aqueous solution in the decomposition zone.

5. Apparatus for obtaining a hydrate from an aqueous solution comprising: a hydrate-forming chamber, a hydrate decomposing chamber, the hydrate forming chamber being from 3 to 20 times larger than the hydrate decomposing chamber, means connecting said chambers for endless circulation of said solution between said chambers, means for adding a feed of said aqueous solution to said circulating solution at said hydrate decomposition zone in a direction to induce said circulation, means for adding a hydrate forming material to said circulating solution at said hydrate forming zone in a direction also to induce said circulation, whereby a hydrate forms in said hydrate forming zone, and means for withdrawing a portion of said solution and said hydrate between said hydrate forming zone and said hydrate decomposing zone as the circulation leaves said hydrate forming zone but before it enters said hydrate decomposing zone.

6. A unitary recycle reactor substantially as recited in claim 5 wherein the means for adding the hydrate-forming substance comprises a device equipped with means for ejecting the hydrate-forming substance in finely-divided form.

References Cited in the file of this patent

UNITED STATES PATENTS

| | | |
|---|---|---|
| 1,646,454 | Isaachsen | Oct. 25, 1927 |
| 2,904,511 | Donath | Sept. 15, 1959 |
| 3,027,320 | Buchanan | Mar. 27, 1962 |